(12) United States Patent
Wiebrecht

(10) Patent No.: US 8,181,344 B2
(45) Date of Patent: May 22, 2012

(54) ENGINE AND METHOD FOR IMPROVED CRANKCASE FATIGUE STRENGTH WITH FRACTURE-SPLIT MAIN BEARING CAPS

(75) Inventor: Eric Donald Wiebrecht, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 979 days.

(21) Appl. No.: 12/174,051

(22) Filed: Jul. 16, 2008

(65) Prior Publication Data
US 2010/0011574 A1    Jan. 21, 2010

(51) Int. Cl.
*B23P 17/00* (2006.01)
*F02B 75/22* (2006.01)

(52) U.S. Cl. ....... 29/888.01; 29/412; 29/413; 123/195 R

(58) Field of Classification Search ............ 29/412–413, 29/888.01, 888.12; 123/195 R
See application file for complete search history.

(56) References Cited

U.S. PATENT DOCUMENTS

| | | | | |
|---|---|---|---|---|
| 3,464,746 A | * | 9/1969 | Weber | 384/432 |
| 3,818,577 A | * | 6/1974 | Bailey et al. | 29/413 |
| 4,569,109 A | * | 2/1986 | Fetouh | 29/888.09 |
| 4,684,267 A | * | 8/1987 | Fetouh | 384/294 |
| 4,719,677 A | * | 1/1988 | Arnold | 29/888.08 |
| 5,716,145 A | | 2/1998 | Eidenbock et al. | |
| 6,817,505 B2 | * | 11/2004 | Hahnel et al. | 225/2 |
| 2009/0046962 A1 | * | 2/2009 | Kociba et al. | 384/294 |

FOREIGN PATENT DOCUMENTS

| | | |
|---|---|---|
| DE | 1218213 B | 6/1966 |
| DE | 1750595 A | 2/1971 |
| DE | 4302303 A1 | 8/1994 |
| DE | 4413255 A1 | 10/1995 |
| DE | 19849080 A1 | 4/2000 |
| DE | 10259152 A1 | 4/2004 |

* cited by examiner

*Primary Examiner* — Alexander P Taousakis
(74) *Attorney, Agent, or Firm* — Quinn Law Group, PLLC

(57) ABSTRACT

The present invention provides reduced fatigue stress levels in a stressed area of an engine crankcase by lowering the outer edges of the crankshaft bearing cap fracture-split lines without changing the central axis location of the crankshaft in the crankcase. This is accomplished by causing the fracture-split lines of the bearing caps to angle downward from the horizontal plane of the crankshaft axis to a slightly lower position at the outer edges of the bearing caps. This lowers the outer edges of the bearing caps sufficiently to allow larger radii to be formed on the lateral connectors of the crankcase support webs with the adjacent sidewalls of the crankcase. Accordingly, the fatigue stress levels in the crankcase web members are reduced without requiring a significant change in the crankcase dimensions.

3 Claims, 4 Drawing Sheets

ENGINE AND METHOD FOR IMPROVED CRANKCASE FATIGUE STRENGTH WITH FRACTURE-SPLIT MAIN BEARING CAPS

TECHNICAL FIELD

This invention relates to engine block structure and particularly to the reduction of fatigue stresses in the crankcase web areas above fracture-split crankshaft bearing caps.

BACKGROUND OF THE INVENTION

It is known in the art relating to engine crankcases that crankshaft support webs are required to absorb major stresses from the combustion and inertia loads developed in the engine cylinders and from the reciprocating and rotating masses connected to the crankshaft throws. To withstand these loads, engine crankcases and cylinder blocks may be formed as a single casting and machined with the crankshaft bearing caps in place. The bearing caps are then cracked off with a mandrel, leaving a generally horizontal split line of cracked surfaces at which the bearing caps are reattached to the crankcase with bolts or studs.

To minimize stresses, joining of the support webs to crankcase sidewalls makes use of smoothly curved joints avoiding sharp angles which would introduce stress risers. These joints begin above the split line for the bearing caps, which may limit the space available for larger stress reducing radii in the support webs themselves. Such a problem was presented when it was desired to increase the fatigue strength of an already completed crankcase design without changing the basic crankcase dimensions.

SUMMARY OF THE INVENTION

The present invention solves the problem presented by lowering the outer edges of the crankshaft bearing cap split line without changing the central axis location of the crankshaft in the crankcase. This is accomplished by causing the split lines of the bearing caps to angle downward from the horizontal plane of the crankshaft axis to a slightly lower position at the outer edges of the bearing caps. This lowers the outer edges of the bearing caps sufficiently to allow larger radii to be formed on the lateral connectors of the crankcase support webs with the adjacent sidewalls of the crankcase. Accordingly, the fatigue stress levels in the crankcase web members are reduced without requiring a significant change in the crankcase dimensions.

The ability to make the needed design change required assurance that the crankcase supplier can indeed crack off the crankcase bearing caps within a predetermined tolerance that assures an adequate slope of the bearing cap split lines. The bearing caps are cast and machined as part of a one-piece crankcase assembly. Two notches are created in the horizontal plane at the inside bearing bore diameter 180 degrees apart. These serve as crack initiators for the fracture splitting process. The bearing caps are then fracture-split from the cast assembly by an expanding mandrel inserted through the main bearing bore from one end of the block. The crack angle or direction as it travels away from the initiation notch is influenced by changing the shape of the expansion mandrel, specifically the shape of the contact points which touch and apply load to the inside of the bearing bore. The expansion shapes are controlled to a close tolerance and are correlated back to a corresponding crack angle range.

As the crack path is purposefully angled downward on each side, the crack path is directed away from highly-stressed areas, allowing these areas to be increased in size to reduce their stress concentration. The invention resides in the concept of purposefully directing the crack angle downward on each side to enable a larger, stronger cross-section. The larger section would be impossible to achieve without the directed crack angle. Manufacture of the crankcase members in this manner allows the design change of the slightly larger radius for the junction of the web to outer wall radii that provides the improved fatigue stress for the crankcase.

It should be noted that the terms crack-split and fracture-split and other similar pairs of terms are used interchangeably in the specification and claims and are considered to have the same meanings.

These and other features and advantages of the invention may be more fully understood from the following description of an exemplary embodiment, taken together with the accompanying drawings.

DESCRIPTION OF AN EXEMPLARY EMBODIMENT

Figure 1:
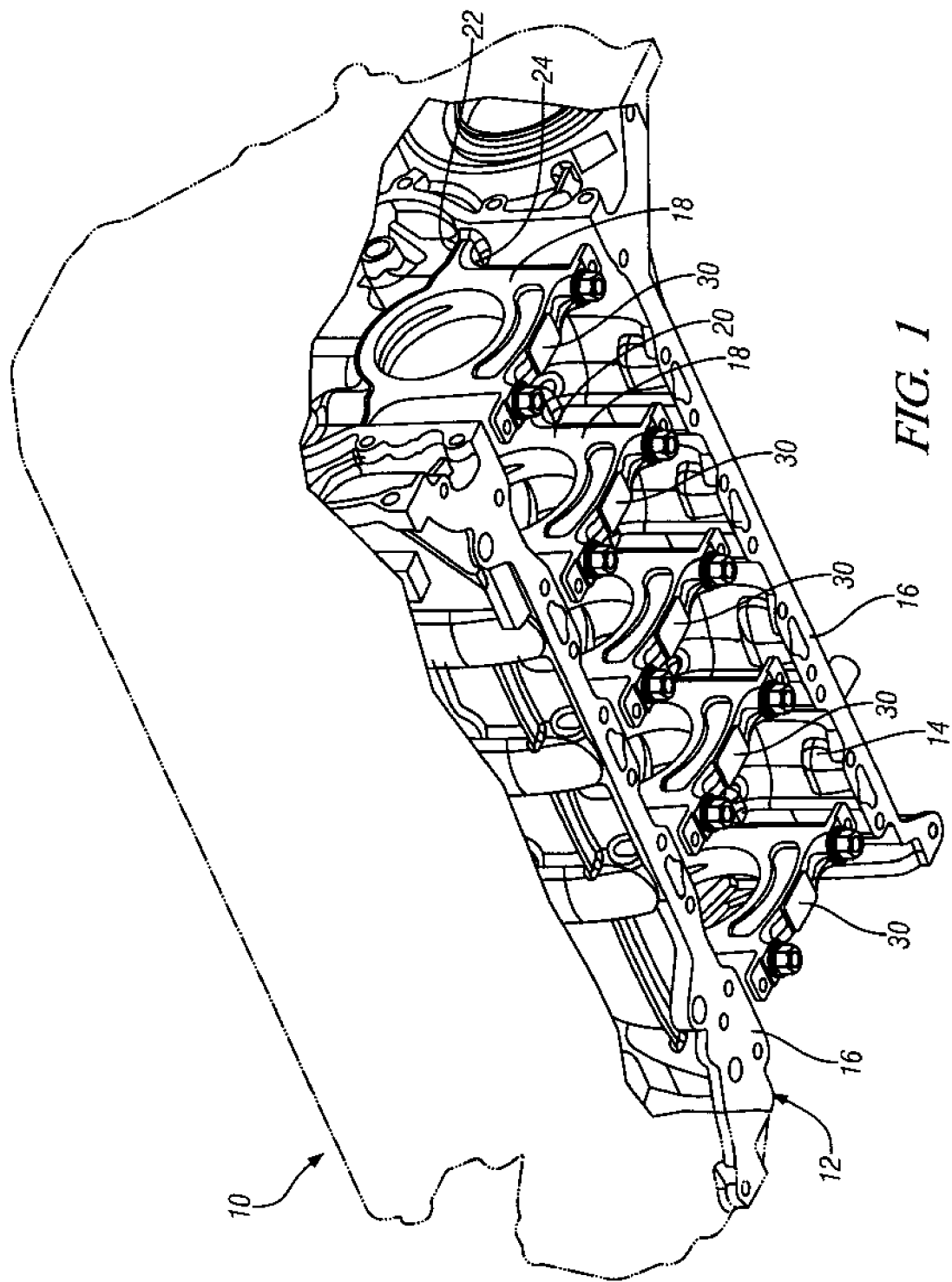
FIG. 1 is a low angle pictorial view of an engine block directed toward the crankcase structure with multiple crankshaft support web walls extending between sidewalls and including crack-split separable bearing caps.
Figure 2:
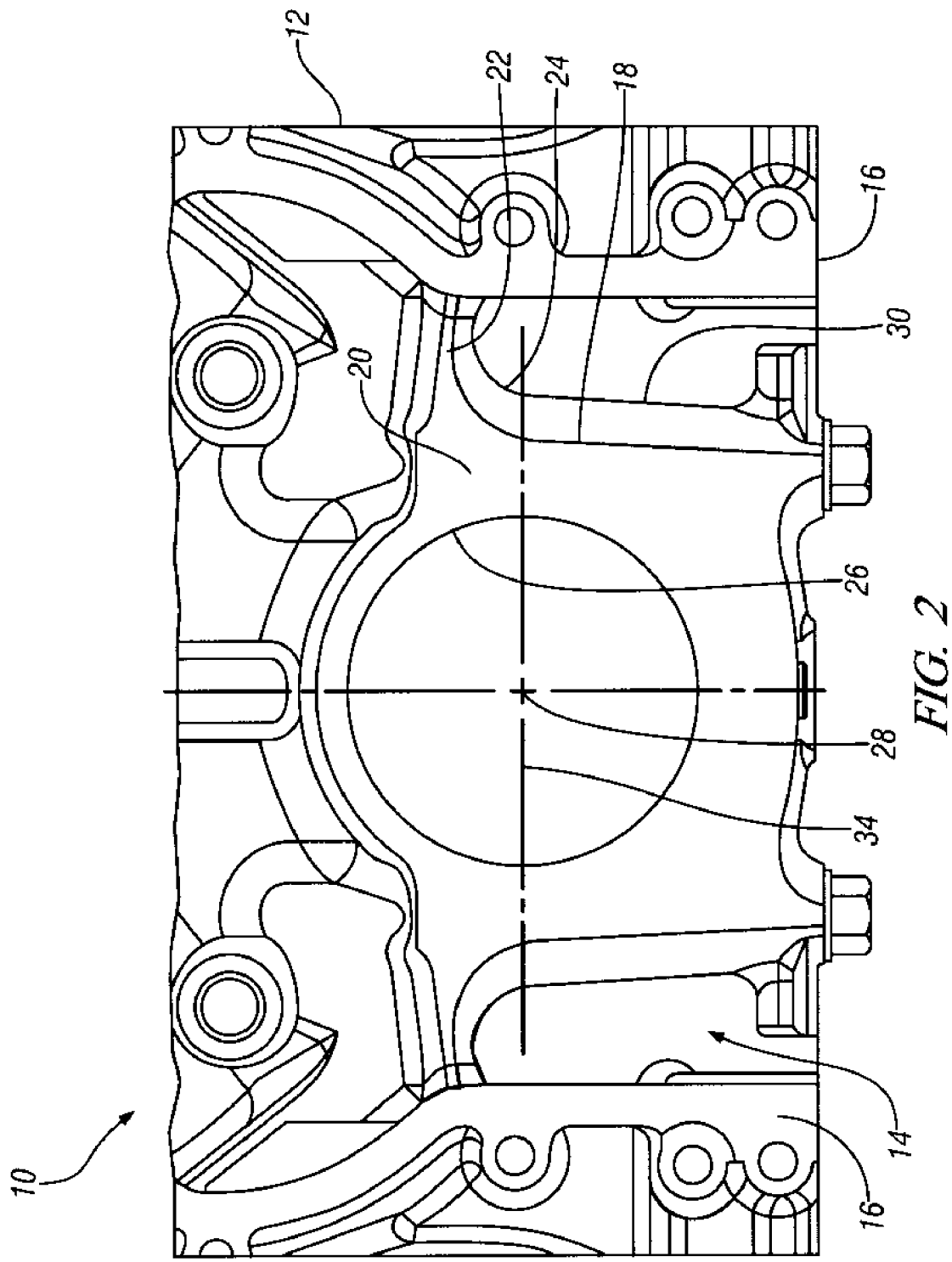
FIG. 2 an end view of the engine block directed toward the crankshaft bearing support area.

Referring now to FIGS. 1 and 2 of the drawings in detail, numeral 10 generally indicates an outline view of an exemplary internal combustion engine having a cylinder block 12 in which pertinent details of the structure in a lower portion of the engine crankcase 14 are disclosed. The lower crankcase 14 includes a pair of generally parallel longitudinally extending sidewalls 16 having a plurality of longitudinally spaced laterally extending web walls 18 including upper portions 20 that are attached to the sidewalls 16 by load carrying lateral connectors 22. To minimize fatigue stresses, the connectors are provided with substantial blend radii 24 connecting the upper portions 20 of the web walls 18 with the sidewalls 16.

In manufacture, the engine cylinder block 12 is cast and machined to finished dimensions as a one piece assembly. Machining includes boring of crankshaft bearing bores 26 aligned on an axis 28 in the lower portions of the web walls 18. After machining, the crankshaft main bearing caps 30 are removed from the remaining upper portions 20 of the web walls 18 by crack or fracture-splitting the bearing bores 26 beginning at notches 32 cut on opposite sides of the bores 26 in alignment with a horizontal plane 34 through the axis 28 and splitting the caps 30 from the web walls 18.

Figure 3:
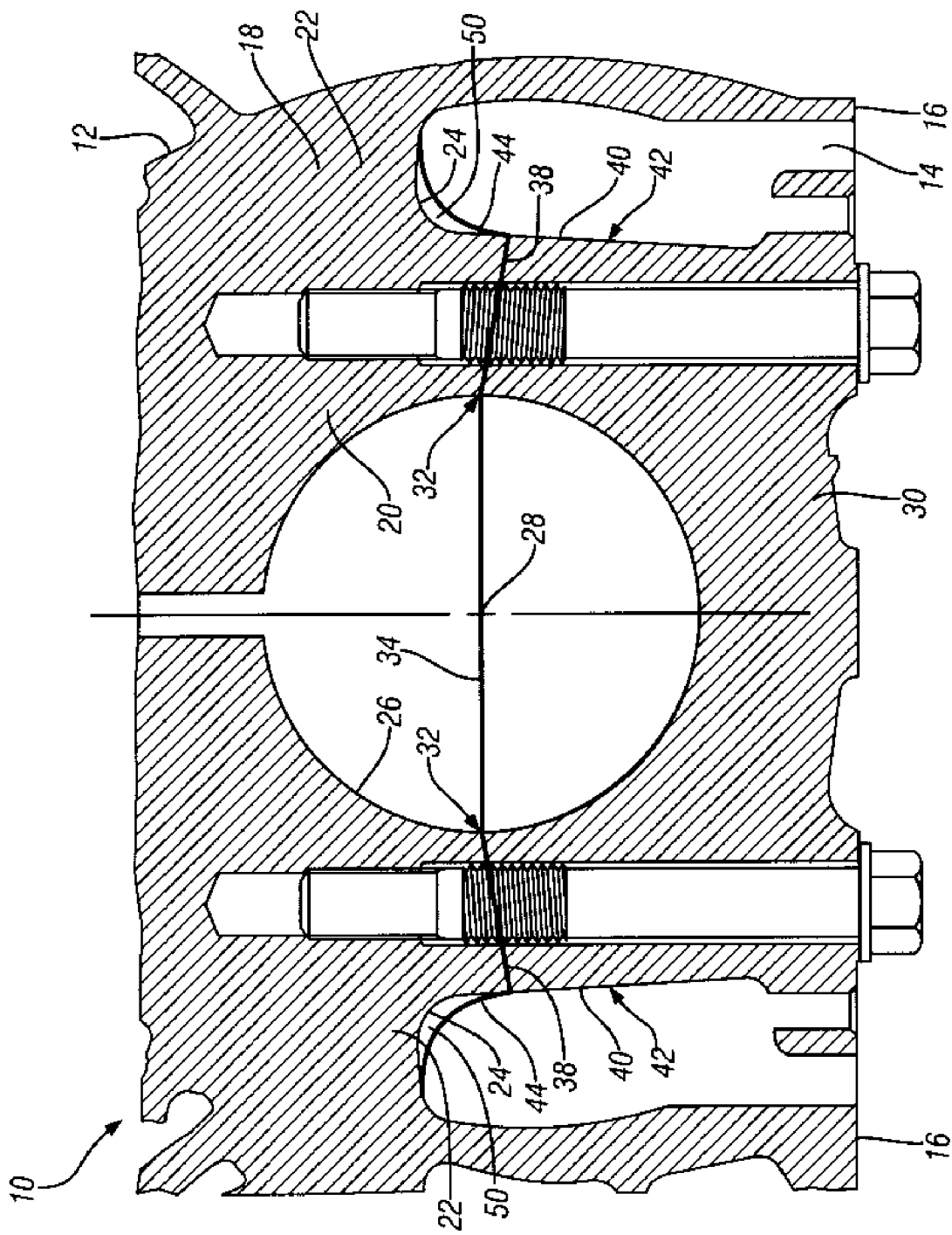
FIG. 3 is an enlarged cross-sectional view of a web wall lower portion with attached bearing cap showing the nominal slope of the bearing cap crack-split lines.
Figure 4:
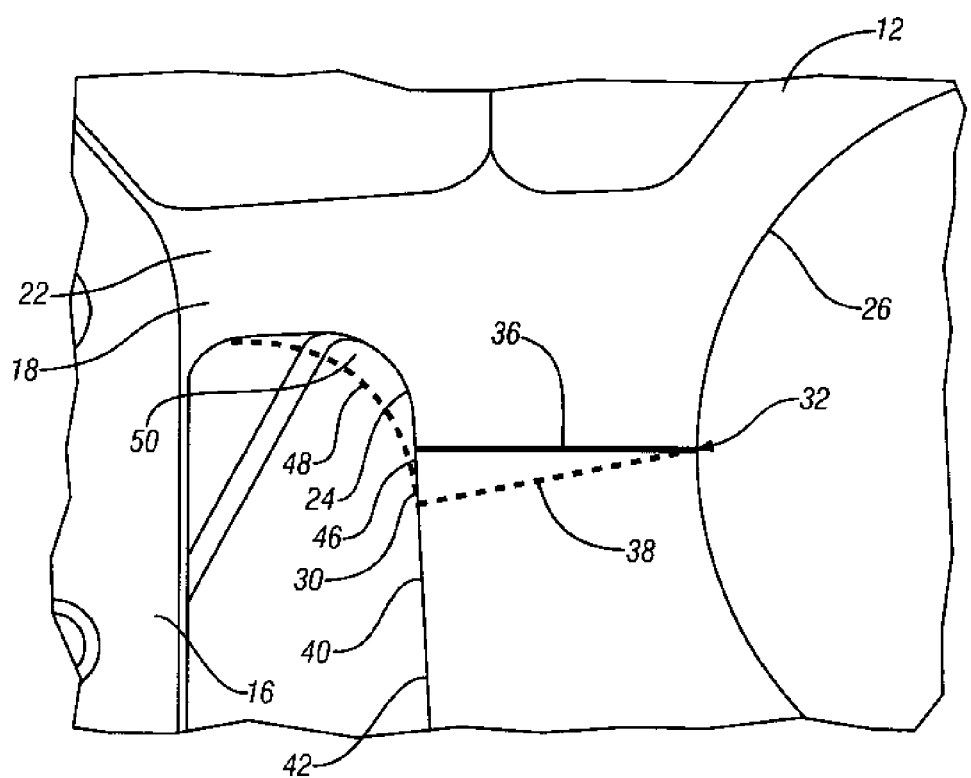
FIG. 4 is an enlarged view of the support area comparing the previous flat crack line with the downwardly angled crack line and increased blend radius of the invention.

In accordance with prior technology, it has been conventional to crack-split caps 30 along split lines 36 maintained nominally in the horizontal plane 34 through the longitudinal axis 28 of the aligned crankshaft bearing bores 26, as shown in FIGS. 3 and 4.

However, in accordance with the present invention, the crack-splitting step was modified, by proper shaping of a splitting mandrel, so that the resulting crack-split lines 38, beginning at the notches 32 in the horizontal plane 34 of the bearing bore axis 28, are sloped downward from the central notches 32 toward outer edges 40 of the bearing caps 42. This change accomplishes a desired result in that the outer edges 40 of the new bearing caps 42 are made shorter and the mating outer edges 44 of the modified upper portions 46 of the web walls 18 are made longer so that a larger blend radius 48 may be applied to the lateral connectors 50, providing the high stress areas of the lateral connectors with a reduction in fatigue stresses and the ability to carry higher loads than with the prior configuration bearing cap split lines.

For the sake of clarity, it is noted that the split lines of crack-split bearing caps and other products have rough surfaces and are not necessarily straight lines, however, it is not necessary for perfectly straight split lines to be formed in order to obtain the benefits of the present invention. It is only necessary that the split surfaces be sufficiently accurate to meet reasonable tolerances to obtain the benefits of the reduced fatigue stresses made possible by the modified design While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A method of manufacturing an engine cylinder block, the method comprising:
    casting and machining the engine cylinder block as a single one-piece assembly to include:
        a pair of generally parallel longitudinally extending sidewalls defining a lower crankcase therebetween;
        a plurality of longitudinally spaced laterally extending web walls, each having an upper portion attached to the pair of sidewalls by a lateral connector, and a lower portion;
        a plurality of crankshaft bearing bores aligned on a crankshaft bore axis and extending through the lower portion of each of the web walls, wherein the crankshaft bore axis is disposed on a horizontal plane bisecting the crankshaft bearing bores and extending between the sidewalls, and wherein the lower crankcase extends upward beyond the horizontal plane; and
        a plurality of blend radii, with each blend radii connecting the upper portion of one of the web walls with one of the lateral connectors; and
    fracture-splitting a bearing cap from each of the web walls along a downwardly sloping fracture-split line initiated at opposite sides of the crankshaft bearing bores on the horizontal plane and extending downward at a predetermined angle to outer edges of the bearing caps disposed below the horizontal plane and wherein the radius of each of the blend radii is increased so that the blend radii extends from a location at the outer edge of the bearing cap disposed below the horizontal plane to the lateral connector disposed above the horizontal plane.

2. The method as in claim 1 including controlling the slope of the split-lines within a predetermined tolerance established to assure consistency of the improved fatigue strength of the critical areas.

3. The method of claim 1 including initiating fracturing of the bearing cap fracture-split lines at notches formed on opposite sides of the crankshaft bores and aligned in a horizontal plane through the longitudinal axis of the bores.

\* \* \* \* \*